R. C. SEYMOUR.
FOLDING MACHINE.
APPLICATION FILED JAN. 13, 1909.

931,230.

Patented Aug. 17, 1909.
7 SHEETS—SHEET 1.

Fig. 1.

Witnesses:
John Darby
Katharine Sexton

Inventor
R. C. Seymour
By his Attorney John D Morgan

R. C. SEYMOUR.
FOLDING MACHINE.
APPLICATION FILED JAN. 13, 1909.

931,230.

Patented Aug. 17, 1909.
7 SHEETS—SHEET 4.

R. C. SEYMOUR.
FOLDING MACHINE.
APPLICATION FILED JAN. 13, 1909.

931,230.

Patented Aug. 17, 1909.
7 SHEETS—SHEET 5.

Fig. 6.

R. C. SEYMOUR.
FOLDING MACHINE.
APPLICATION FILED JAN. 13, 1909.

931,230.

Patented Aug. 17, 1909.
7 SHEETS—SHEET 6.

R. C. SEYMOUR.
FOLDING MACHINE.
APPLICATION FILED JAN. 13, 1909.

931,230.

Patented Aug. 17, 1909.
7 SHEETS—SHEET 7.

Witnesses:
John Darby
Katharine Sexton

R. C. Seymour, Inventor
By his Attorney John D. Morgan

UNITED STATES PATENT OFFICE.

RALPH C. SEYMOUR, OF LARCHMONT, NEW YORK, ASSIGNOR TO THE GOSS PRINTING PRESS COMPANY, OF CHICAGO, ILLINOIS, A CORPORATION OF ILLINOIS.

FOLDING-MACHINE.

No. 931,230.        Specification of Letters Patent.        Patented Aug. 17, 1909.

Application filed January 13, 1909. Serial No. 472,093.

*To all whom it may concern:*

Be it known that I, RALPH C. SEYMOUR, a citizen of the United States, and residing at Larchmont, in the county of Westchester and State of New York, have invented certain new and useful Improvements in Folding-Machines, of which the following is a specification.

The invention relates to folding machines and in certain of its aspects to rotary folding machines, although in certain other aspects the invention may be applicable to other kinds of folding machines.

Objects of the invention are to provide for handling a sheet during folding to avoid all creasing, rubbing, smutting, or other injurious action due to constraint by or contact with the machine parts and at the same time to handle and position the sheet for easy delivery and with the two sides lightly but nicely laid together; to provide for such action and handling of the sheets while running at high speeds, so as to secure a product large in quantity while excellent in quality; to provide for rapid and at the same time exact and uniform folding of the sheets; to secure various products, or various ways of folding, while also realizing the advantages enumerated; to provide mechanisms which effect the various objects coincidently and harmoniously; to provide particular mechanisms within a folding machine for effecting these functions; to provide a machine of simple, strong and economical design and construction, and wherein the parts are easy of access and regulation. These and other objects of invention will in part be obvious and will in part appear hereinafter.

The invention consists in the novel parts, arrangements, constructions, combinations and improvements herein shown and described.

The accompanying drawings, referred to herein and forming a part hereof, illustrate one embodiment of the invention, the same serving in connection with the description herein to explain the principles of the invention.

Referring to the accompanying drawings, illustrating by way of example an embodiment of the invention, suitable means are provided for supplying sheets to the machine. Said means may be of any suitable or convenient form, and may supply the sheets from any suitable source, such as a printing press or other machine. The form of such means shown herein comprises devices for leading a web 1 into the machine, such as tapes 2 traveling about rolls 3. Guide bars 4 and 5 are shown supported upon rods 6 to constitute a throat for further guiding the end of the web as it feeds downwardly as successive sheets are cut off. Any suitable form of means for severing the web into sheets may be provided, and the form thereof herein shown comprises cutting cylinders 7 and 8, which need not be described in detail.

The invention in one of its aspects provides a pair of folding jaws movably mounted upon a traveling carrier, by which the sheet is carried free from contact with or constraint by the other machine parts, so as to avoid the disavantages specified, and in connection with such a construction a control of the movement of the jaws upon the carrier between the point of folding in and the point of delivery such as will bring the sheet nicely together by atmospheric action and dispose or position it most advantageously for transfer to the delivery devices, and to permit of such action at relatively high speed.

More particularly, and as exemplified in the illustrated form of such means, the folding jaws are caused to move relatively to their carrier during the folding in of the sheet and to be at rest relatively thereto for a period just prior to the release of the sheet. By one feature of the invention a folding blade is provided swinging about a center, and coöperating therewith a pair of folding jaws swinging about a center upon their carrier, which also swings about a center, and in connection therewith means for permitting and preventing the movement of the folding jaws about their own center and relatively to their carrier. By permitting the complete set of movements a very nice and accurate, but nevertheless rapid, folding in of the sheets into the jaws is effected, while preventing the motion of the jaws about their center and with respect to their carrier for a period just prior to the release and transfer of the folded sheet to the delivery device, the same excellence and rapidity of operation of that mechanism is maintained, while a most desirable atmospheric action for effecting the drying, folding and positioning of the sheet is secured.

In the form of means herein illustrated carrier arms 9 are shown fixed to a rotating shaft 10. Mounted in said arms 9 away from the shaft 10, and preferably near the extremity of said arms, are shown crank shafts 11 carrying crank arms 12. Between the crank arms 12, and preferably fixed thereto is shown a jaw 13. Coöperating with said jaw 13 is a movable jaw 14 shown mounted upon the shaft 15 carried between the crank arms 12. The shaft 10 is rotated by suitable means, which need not be described in detail, to move the carrier 9 in an endless path, which in the present embodiment is likewise circular. So far as concerns certain features of the invention, however, the travel of the carrier might be along some path of different form. Means are also provided for moving the pair of jaws relatively to their carrier, and in the present embodiment the jaws move in an endless and likewise circular path upon the carrier. The form of such means shown herein comprises a pinion 16 meshing with an idler 17 which in turn is in mesh with a gear 18.

The form of means for controlling the movement of the pair of folding jaws relatively to their carrier shown in the present embodiment comprises devices acting upon the gear 18 to cause it to move with the carrier or to hold it from such movement, and to perform said function in harmony with the positions and functions of the other mechanisms. Accordingly the gear 18 is shown integral with a gear 19, and as being loosely sleeved upon a suitable bushing fixed to the frame 20 of the machine and as held in position by a bracket 21. Meshing with the gear 19 is shown a sector gear 22 fixed to the bent lever 23. The free end of the lever 23 is shown in operative relation, through the roll 24, with a suitable groove or box cam 25 carried on the shaft 26.

A suitable folding blade 27 is shown mounted on a suitable carrier, such as the cylinder 28, to coöperate with the folding jaws. The structure of the folding blade and of the cylinder will be more fully described at a later point. Suitable delivery means are also provided, and as shown herein comprises a cylinder 29 having grippers 30 for taking the sheets from the folding jaws. The construction and action of the said delivery devices will likewise be more fully described in connection with another feature of the invention.

Suitable means for opening and closing the folding jaws at the proper points are provided, and so far as the present invention is concerned they may be of any suitable or convenient form. As shown herein the jaws are normally held closed under the impulsion of springs 31, and are opened by the action of cams 32 on rolls 33 carried by arms 34. The cams 32 are carried on levers 35 which are in turn controlled by suitable cams 36. The general features of said mechanism, as well as the general construction of the folding jaws and their mounting upon the carrier, are substantially similar to the corresponding mechanism shown in my Patent Number 908,157 of December 29, 1908, and detailed description thereof is unnecessary.

In the present embodiment a plurality of folding jaws and carriers are provided, all coöperating with a single folding blade and a single delivery mechanism, or either of these as desired. Two carriers and two pairs of folding jaws are accordingly shown in the present embodiment, the second carrier being indicated generally by the reference numeral 37 and the pair of folding jaws by the numeral 38. These may be used to fold singly, when desired, the folding blade carrier revolving twice for each revolution of the shaft 10.

According to one aspect of the invention, means are provided for collecting and folding together a plurality of sheets, and in the form of such means shown herein the cylinder 28 may be used as a collecting cylinder. And in such case, with the illustrated mechanism, one pair of folding jaws is rendered inoperative. Any suitable form of means for doing this may be provided, and as shown herein (see Fig. 3) the crank shaft 39 is shown removable from the carrier 37 by unbolting the bearing caps 40. The connecting gears may also be removed if desired. Suitable sheet taking means may be provided on the cylinder 28 and grippers 59 are shown for this purpose. Said grippers may be set to take a sheet at each rotation of the cylinder, or after a plurality of rotations, or may be rendered entirely inoperative as may be desired. No specific form of gripper controlling means is shown or described, as various forms of such means are old in the art.

Suitable means for directing the sheet into the bite of the grippers are provided and also means for rendering said means operative or inoperative are likewise provided. The form of such means herein shown comprises tucking blades 45 carried upon a shaft 46 supported on arms 47 fixed to the shaft 10. Springs 48 are shown acting to hold the tucking blades in a retracted position with their supporting arm against a stop 49. Fixed to the shaft 46 is shown an arm 50 carrying a truck roll 51. A suitable cam shape 52 is provided and this may be mounted so as to be movable into and out of the path of the roll 51, as by bolt-and-slot connections 53. When the cam is in position, the tucking fingers 45 will act to press the end of the sheet against the surface of the cylinder 28 so as to cause the grippers 59 to grip the end of the sheet. It will be understood that this feature may be used either when folding single, or when collecting and folding, or when folding single it may be kept inoperative, and the end of the sheet may be allowed to run down freely. When folding double from a plurality of webs the said feature may be used or not as desired. However, by causing a single pair of folding jaws or a plurality thereof to coöperate with the said cylinder, and with suitable operation of the gripping devices, a single or multifold product relatively to the number of webs fed in may be secured.

According to one feature of the invention means for taking the folded sheets from the folding jaws are provided traveling in the same absolute direction but at rest, or traveling in the opposite direction relatively to the traveling folding jaws. The delivery devices shown herein comprise the cylinder 29 provided with suitable sheet taking devices, such as the grippers 30. These may coact with the folding jaws in any suitable manner to engage the sheet along the folded edge, and if desired, this may be done as illustrated and described in my patent hereinbefore referred to. In the present embodiment, the cylinder 29 has a surface or peripheral speed less than that of the linear speed of the folding jaws. This is conveniently effected by giving the carrier and folding jaws and the delivery cylinder the same angular velocity, the difference in radius then giving the desired relation. The cylinder 29 is also shown provided with additional grippers 54 which may be set in harmony with either a single or multifold operation of the folding devices, both sets of grippers acting when both sets of folding jaws are operating. Suitable means for receiving the folded sheets from the delivery cylinder and conveying them away are provided, and the form thereof herein shown comprises a traveling pocket conveyer 55 into which the sheets are directed from the cylinder 29 by suitable stripping fingers 56.

The invention in certain of its features contemplates means for effecting an accurate and uniform folding of the sheet while running at high speed without any plucking, straining, or harmful drawing of the sheet, and in carrying out this feature of the invention a form of means has been provided whereby the blade passes within the jaws without friction or sliding of these parts upon each other or upon the interposed sheet, and providing for a sudden and quick closing of the jaws upon the sheet and blade, and according to one feature a movement of the blade with a movable jaw toward a fixed jaw, and then a compensating movement of the blade during the combined traveling and withdrawing motion of the closed jaws carrying the sheet. The form of such means shown herein, an addition to the general arrangement and construction of parts already described, comprises a spring mounting for the tucking blade 27. Said blade is also shown mounted in the block 60, which is adjustable upon its cylinder. The blade 27 may be substantially rigid in itself, and is shown herein mounted in a rod 61 rotatably carried by the block 60. The block 60 is shown recessed at 63 so as to permit the blade 27 to move when engaged by the closing movable jaw member, and also when for an instant it is gripped by the closed jaw, the springs then acting to restore it to its initial position. The cylinder 28 is shown with a flattened or scarfed portion 64 which will permit movement of the sheet during the entry of the tucking blade with the sheet into the folding jaws without causing any plucking of the sheet from beneath the gripper or of any undue straining upon the web.

The manner of operation of the herein-described mechanism is substantially as follows: As the web 1 is fed downwardly it will pass along between the guides 4 and 5 and may be either taken up by the gripper upon the cylinder 28 or allowed to run free, as desired. The folding jaws and the folding blade will then coöperate to make a fold in the paper, and about the same instant the cylinders 7 and 8 will sever the sheet from the web, the free end of the web then feeding down for the next operation. It will be seen that the folding blade 27 is swinging around the center of its carrier 28 during the folding in, while the pair of folding jaws is swinging about its own center of rotation on its swinging carrier. Thus the folding blade and the pair of jaws are each traveling on the same side of its own center during the folding in.

Figure 1:
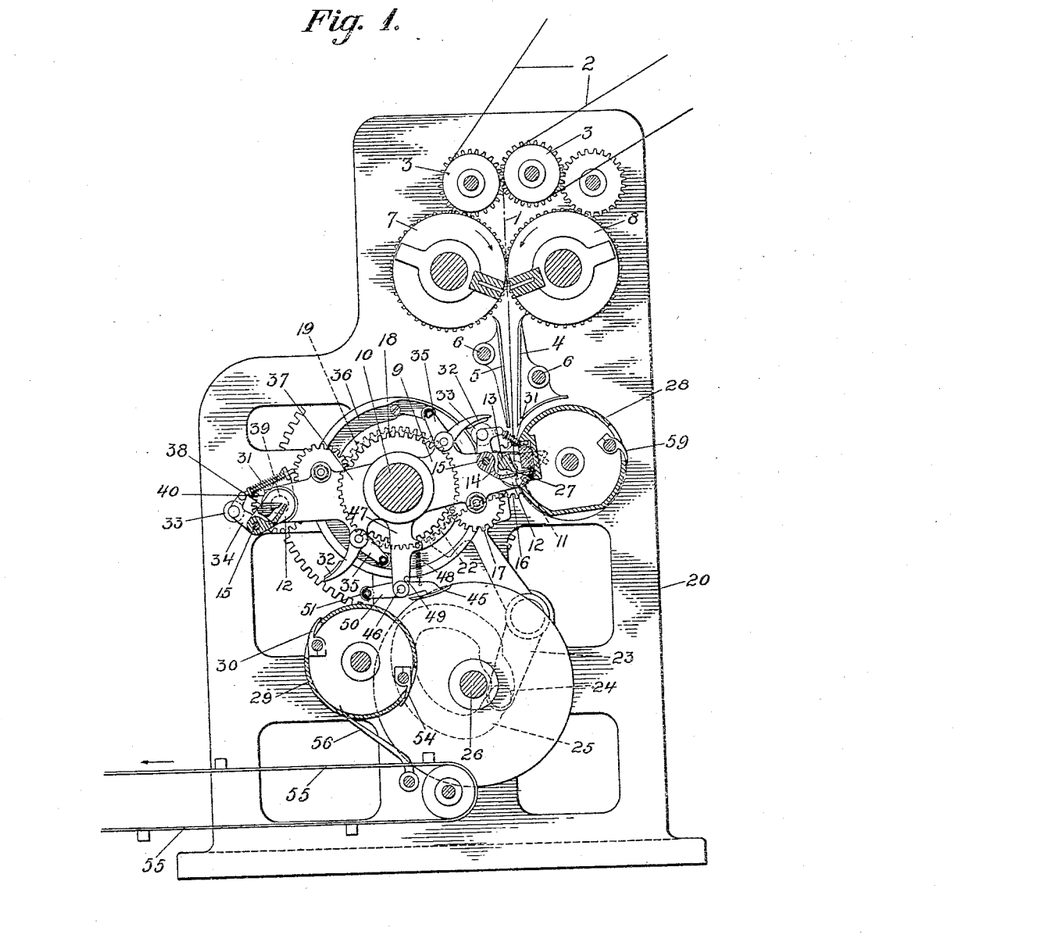
Figure 1 is a vertical section on the line A—B of Fig. 2.
Figure 2:
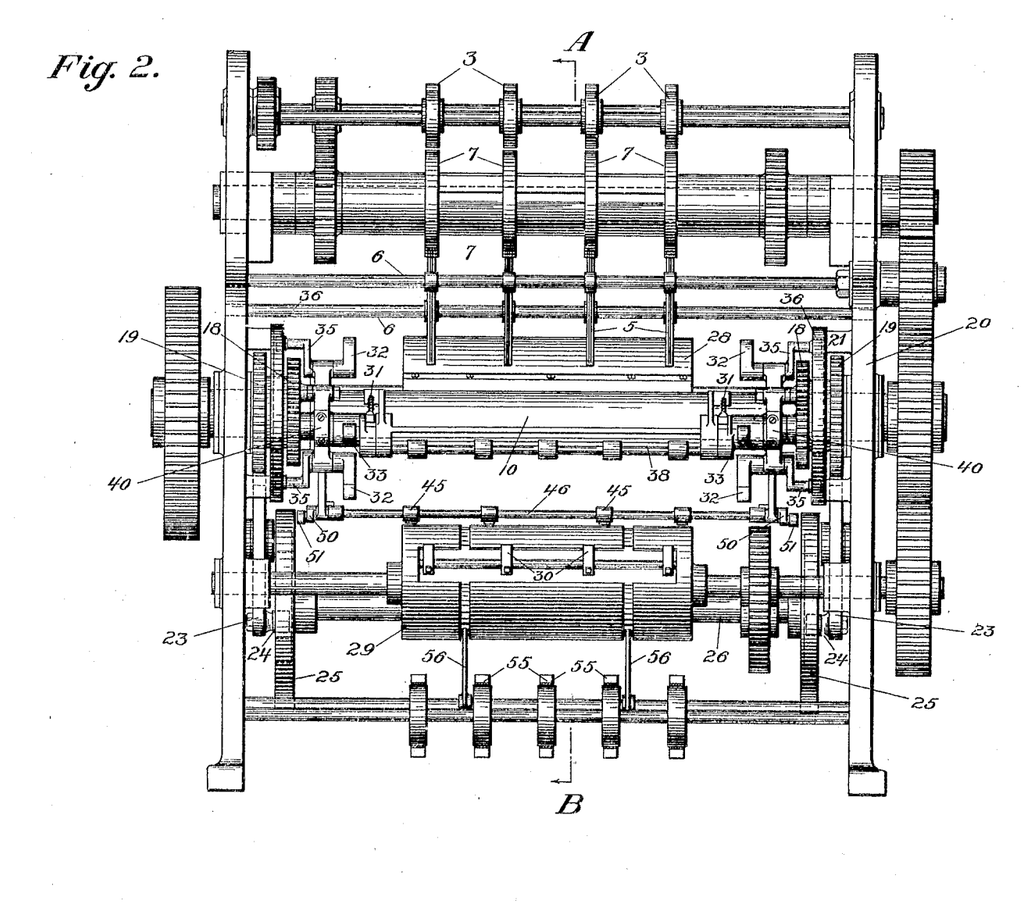
Fig. 2 is an end elevation looking to the right in Fig. 1.
Figure 3:
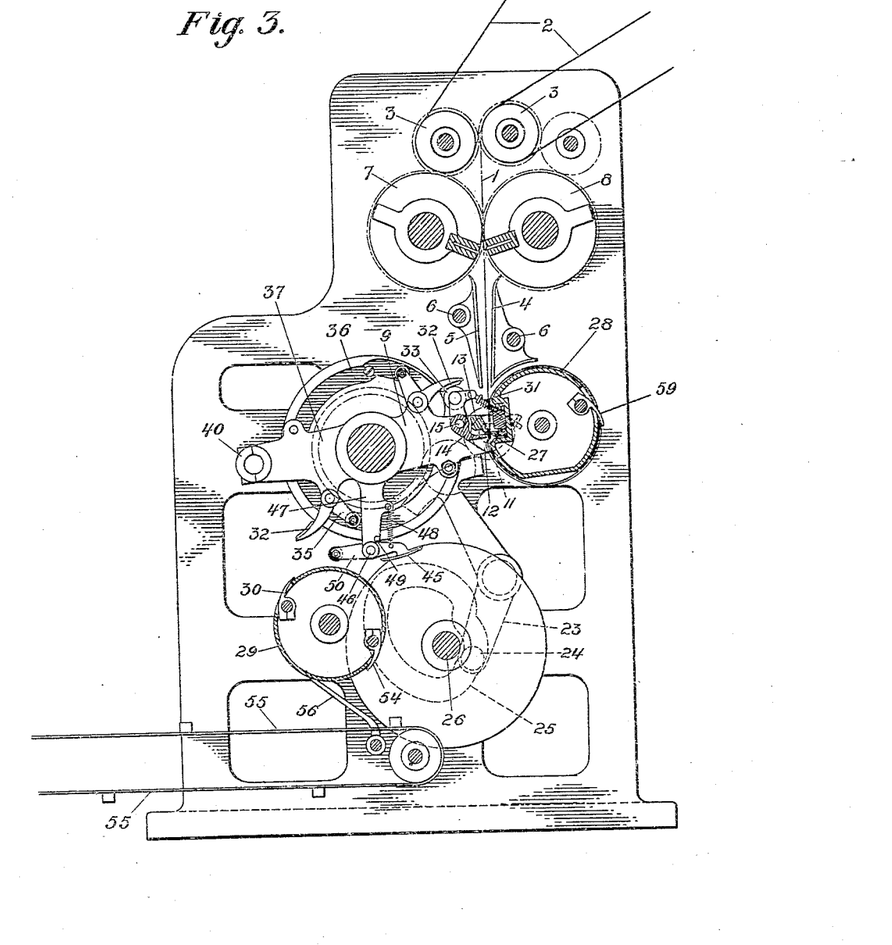
Fig. 3 is a view corresponding to Fig. 1, partly diagrammatic, and showing the machine arranged for collecting and folding.
Figure 4:
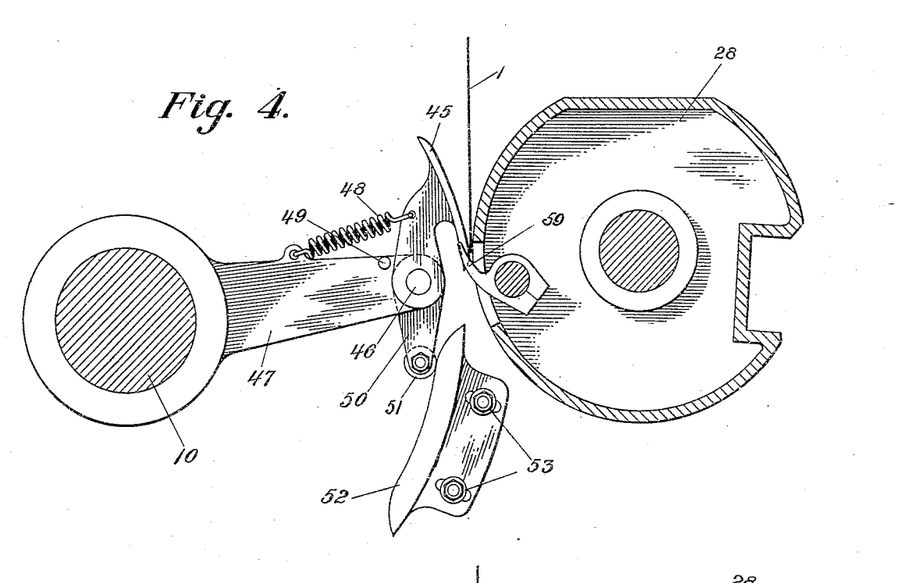
Figs. 4 and 5 show details of the gathering mechanism on an enlarged scale.
Figure 6:
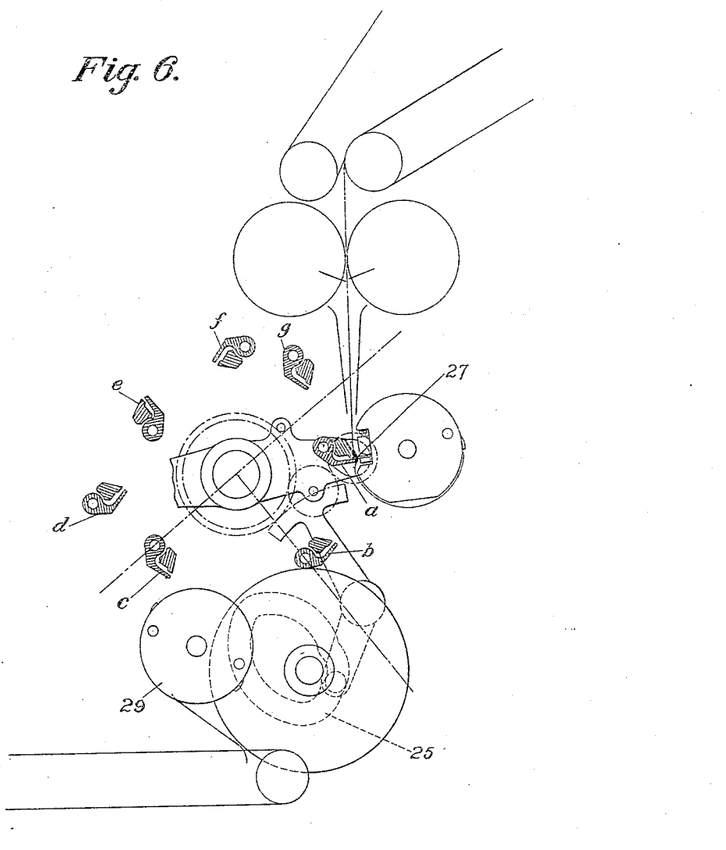
Fig. 6 is a view, partly diagrammatic, showing various positions of the folding jaws during their cycle of movement.
Figure 7:
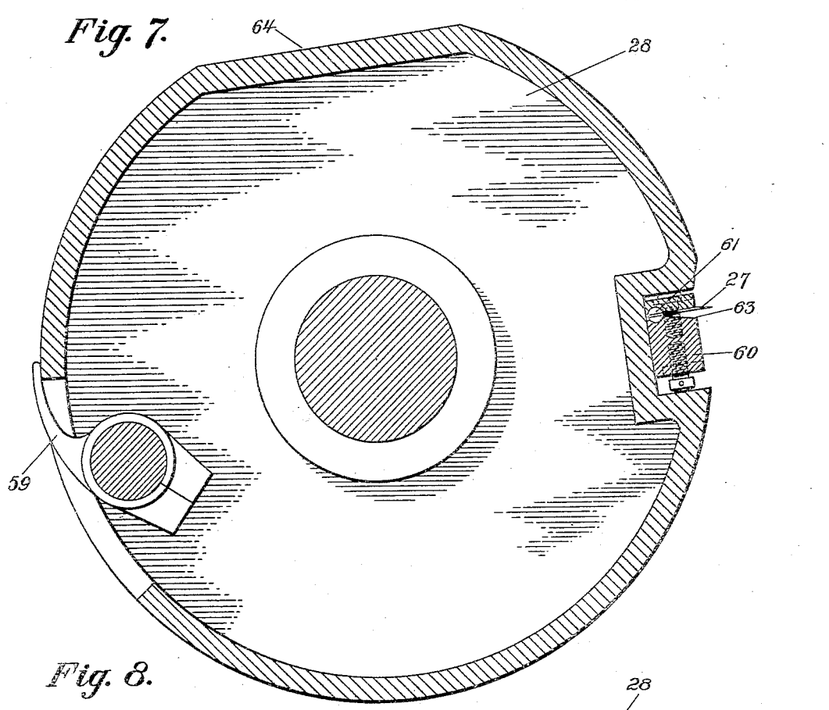
Figs. 7 and 8 show details of construction of the folding blade on an enlarged scale.
Figure 8:
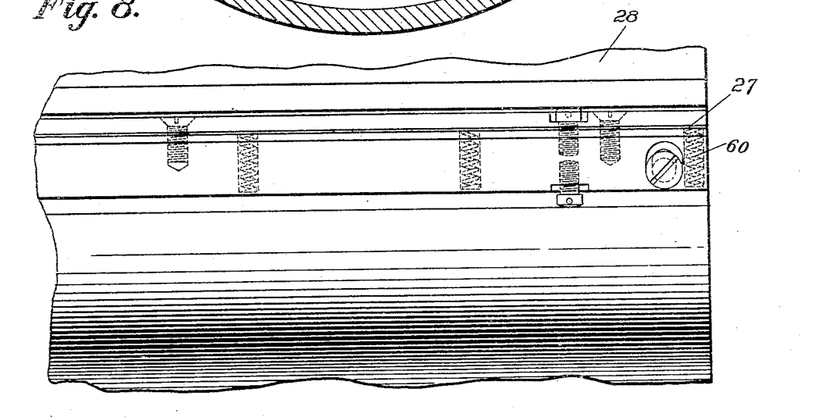

In greater particularity in the present embodiment and referring to Figs. 1, 3 and 6, the folding blade 27 is swinging about the center of the cylinder 28, and at the left of said center; the pair of folding jaws 13, 13

14, carried by the crank arms 12, are swinging about the bearing of said crank arms 12 in or near the ends of the carrier arms 9. Said crank arms 12 are at the left of their bearings in said figures of the drawings. Thus it will be seen that the pair of jaws and the blade are swinging about the same sides of their respective centers during the folding in of the sheet.

By reference to Fig. 6 a plurality of positions of the folding jaws will be seen. In the present instance the gears 16 and 18 are in the ratio of two to one, thus giving two absolute rotations of the jaws upon the carrier during each cycle of operation, but owing to the movement of the carrier in the opposite direction giving but one revolution of the jaws relatively to the carrier for each revolution of the carrier. If the gear 18 be moved during the travel of the carrier 9, the movement of the folding jaws relatively to the carrier will be modified accordingly, and if during a cycle of movement of the carrier, that is, during one revolution, the gear 18 is moved in one direction and then moved back again an equal distance in the opposite direction, it will be seen that the movement of the jaws relatively to their carrier will be intermittent, or varied, but that the jaws will be in the same position at the end as at the beginning of the cycle of revolution.

In Fig. 6 the folding jaws are shown at (a) having the sheet folded thereinto by the folding blade 27. At (b) the jaws are shown pointing backwardly, that is, with the folded edge engaged by the jaws in advance. At this point the geared sector 22 is given movement by the cam 25 to compensate for the movement of the carrier 9. Thus the folded sheet is carried freely through the atmosphere without further rotation but with a movement of translation, which acts to bring the two parts of the sheet together. During this time the sheet is delivered to the delivery cylinder 29. At about the position (c) the sector 22 receives movement in the opposite direction, and the jaws now receive an accelerated rotation due to the resultant of the movement of the carrier arms 9 in one direction and of the gear 18 in the opposite direction. Various positions of the jaws during such movement are shown approximately from (b) to (g) respectively. At the position (g) or near thereto, the gear 18 comes to rest and a less rapid movement is imparted to the folding jaws about their center during the folding in operation. The cycle of movements described is then repeated with succeeding sheets.

Figure 5:
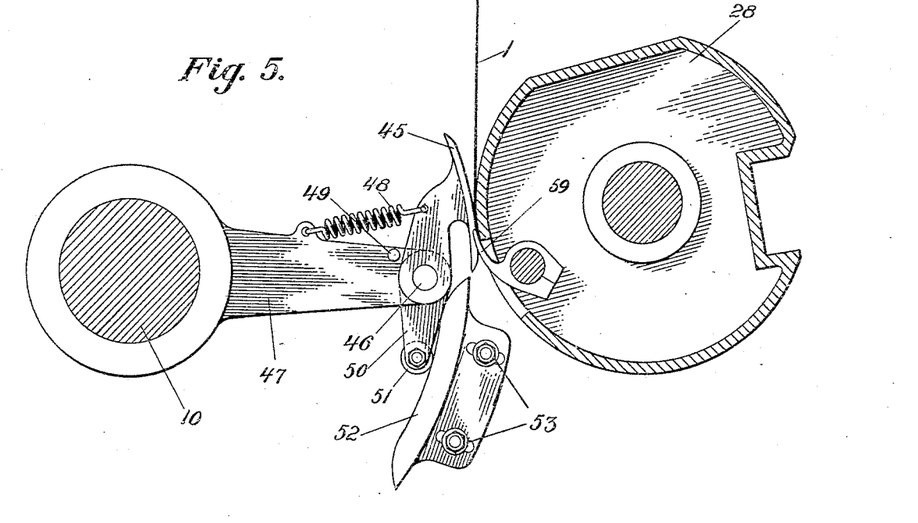

To effect the multifold operation, which with the present embodiment consists in a double folding, one pair of folding jaws is rendered inoperative, and this may be effected by removing the jaws by unbolting the bearing cap 40 (see Fig. 3). The cam 52 is now adjusted to operate the tucking blade 45. The gripper 59 takes the sheet, as shown in Fig. 5, the sheet passing around the cylinder, and as the folding jaws 38 are removed or otherwise inoperative, there is no folding action and the grippers carry the sheet around for the subsequent revolution. The end of the web 1 is again run downwardly and the tucking blade 45 presses it against the cylinder 28, already carrying the previous sheet, as shown in Fig. 3. The operative folding jaws 13 and 14 now fold the associated sheets over the folding blade 27, the gripper 59 opening to release said sheets. The delivery action may be substantially the same in both cases excepting that but one set of grippers on the delivery cylinder are used for the double folding instead of both. The action of the specific form of delivery cylinder has already been explained in connection with the previous description.

Figure 9:
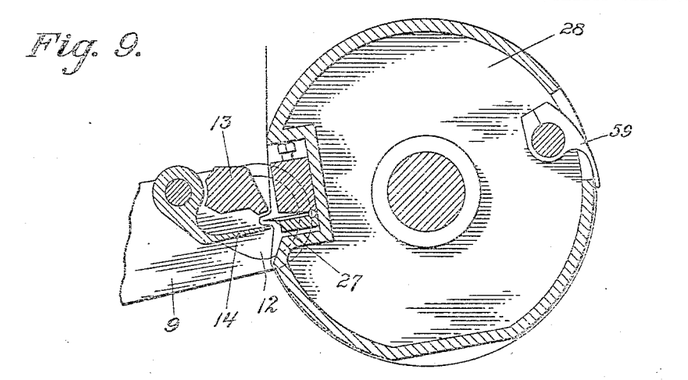
Figs. 9, 10 and 11 show the folding blade and folding jaws in various positions.
Figure 10:
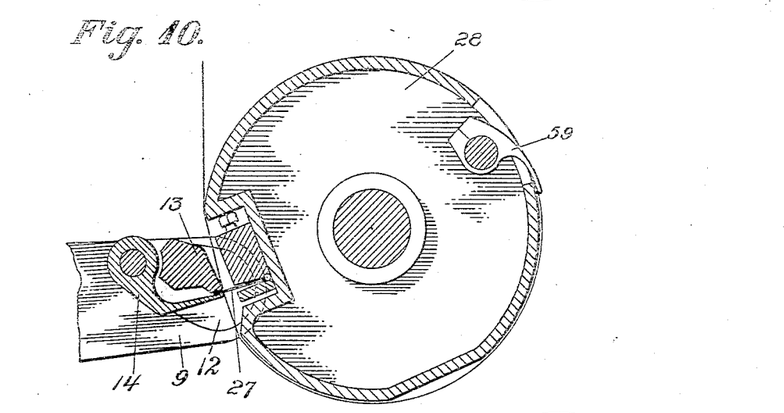
Figure 11:
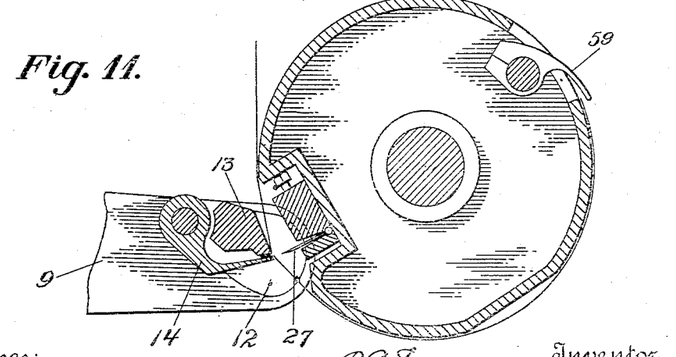

In Figs. 9, 10 and 11 the action of the folding jaws and folding blade are shown in detail, it being understood that said showing is more or less diagrammatic. The swinging of the cylinder 28 and of the carrier 9 about their centers causes the blade to move inwardly with the sheet between the separated jaws 13 and 14. Said parts are so proportioned and positioned that the jaws do not bind on the blade but a free space is left therebetween, as shown in Fig. 9. The moving jaw 14 then receives the sudden closing movement toward the fixed jaw 13, and the blade 27 moves therewith against its springs. At or about this instant the receding movement begins and the sheet is carried off the blade by the jaws, the blade at the same time being free to move in the opposite direction with the slight angular advance of the cylinder 28 and arms 9 during this time. The flat portion 64 upon the cylinder will act to give the necessary movement of the paper between the grippers 59 and the blade 27 to prevent any plucking at the gripper or slipping or scraping over the blade. In Fig. 11 the folding jaws are shown moving away with the sheet, the folding blade having sprung back to its original position. It will be understood that the action of the said parts is practically the same, so far as this feature is concerned, whether the sheets be taken around the cylinder 28 or not.

From all the foregoing it will be understood that the mechanism shown and described embodies the principles of the invention, and that it realizes the objects of invention and the advantages herein set forth, together with other objects and advantages.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:

1. A folding machine including in combination a pair of folding jaws, a traveling carrier therefor, said parts being constructed and arranged to carry the sheet free from the machine parts except along the fold, and means for causing said pair of jaws to move relatively to the carrier during a portion of its travel and to be at rest relatively to the carrier during another portion of its travel.

2. A folding machine including in combination a folding blade, a pair of folding jaws, a traveling carrier therefor, said parts being constructed and arranged to carry the sheet free from the machine parts except along the fold, and means for causing said jaws to move relatively to their carrier during the folding in of the sheet, and to remain at rest relatively thereto for a period prior to the release of the sheet.

3. A folding machine including in combination a folding blade swinging about a center, a carrier swinging about a center, a pair of folding jaws movably mounted on said carrier, said carrier and jaws being constructed and arranged to permit the sheet to move free from the machine parts except along the fold, and means for causing the pair of jaws to move relatively to the carrier during a portion of its travel, and to remain at rest relatively thereto during another portion of its travel.

4. A folding machine including in combination a folding blade swinging about a center, a carrier swinging about a center, a pair of folding jaws movably mounted on said carrier, said carrier and jaws being constructed and arranged to permit the sheet to move free from the machine parts except along the fold, and means for causing said pair of jaws to move relatively to their carrier during the folding in of the sheet, and to be at rest relatively thereto for a period prior to the release of the sheet.

5. A folding machine including in combination a folding blade swinging about a center, a carrier swinging about a center, a pair of folding jaws mounted on said carrier to swing about a center, said carrier and jaws being constructed and arranged to permit the sheet to move free from the machine parts except along the fold, and means for causing and preventing said movement of the pair of jaws.

6. A folding machine including in combination a folding blade swinging about a center, a carrier swinging about a center, a pair of folding jaws mounted on said carrier to swing about a center, said carrier and jaws being constructed and arranged to permit the sheet to move free from the machine parts except along the fold, and means for causing said movement of the jaws during the folding in of the sheet, and for preventing said movement for a period prior to the release of the sheet.

7. A folding machine including in combination a folding blade swinging about a center, a carrier swinging about a center, a pair of folding jaws mounted on said carrier to swing about a center, said carrier and jaws being constructed and arranged to permit the sheet to move free from the machine parts except along the fold, means for causing said movement of the jaws during the folding in of the sheet, and for preventing said movement for a period prior to the release of the sheet, and means swinging about a center for engaging the sheet at its folded edge as it is released by the folding jaws.

8. A folding machine including in combination a pair of folding jaws, a carrier upon which said jaws are mounted to rotate about a center, means for folding a sheet into said jaws, and means for causing and preventing the rotation of the jaws about their center while carrying the sheet.

9. A folding machine including in combination a pair of folding jaws, a carrier upon which said jaws are mounted to rotate about a center, means for folding a sheet into said jaws, means for causing the jaws to rotate about their center while receiving the sheet and for preventing such rotation for a period prior to delivering the sheet.

10. A folding machine including in combination a pair of folding jaws, a carrier upon which said pair of jaws is movably mounted, means for moving said jaws in an endless path relatively to said carrier and for varying the movement of said jaws relatively to their carrier.

11. A folding machine including in combination a pair of folding jaws, means for folding a sheet into said jaws, means for receiving from the jaws the folded sheet, a carrier for the jaws moving between the folding in and the delivering positions, means for causing the folding jaws to move about their center during the folding in of the sheet and for preventing said movement during the delivery of the sheet.

12. A folding machine including in combination a pair of folding jaws, means for folding a sheet into said jaws, means for receiving from the jaws the folded sheet, a carrier for the jaws moving between the folding in and the delivering positions, means for causing the folding jaws to move about their center during the folding in of the sheet and for preventing said movement during the latter part of the travel of the carrier toward the point of delivery.

13. A folding machine including in combination a traveling carrier, a pair of folding jaws mounted thereon and moving in an endless path relatively thereto, means for folding a sheet into said jaws, and means for varying the speed of movement of said jaws along their path.

14. A folding machine including in combination a traveling carrier, a pair of folding jaws mounted thereon and moving in an endless path relatively thereto, means for folding a sheet into said jaws, means for moving said jaws along their path during the folding in of the sheet, means for bringing the jaws to rest in their path when the sheet is released and for moving the jaws in their path at an accelerated speed between the said point of release and the point of folding in.

15. A folding machine including in combination a carrier traveling in an endless path at a substantially constant speed, a pair of folding jaws mounted on said carrier to travel in an endless path, means for folding a sheet into said folding jaws, and means for varying the speed of the folding jaws along their path of travel.

16. A folding machine including in combination a rotating carrier, a pair of folding jaws mounted for complete rotation upon said carrier, and means for varying the speed of rotation of said jaws.

17. A folding machine including in combination a carrier rotating at a substantially constant speed, and a pair of folding jaws completely rotating on said carrier, and means for controlling the rotation of said jaws.

18. A folding machine including in combination a pair of folding jaws mounted to rotate completely about a common axis, and means for causing and preventing said rotation.

19. A folding machine including in combination a pair of folding jaws mounted to rotate completely about an eccentric axis, and means for causing and preventing said rotation.

20. A folding machine including in combination a folding blade swinging about a center, folding jaws swinging about a center, said blade and jaws swinging on the same side of their respective centers during the folding in of the sheet, and means for varying the swinging movement of said folding jaws.

21. A folding machine including in combination a folding blade swinging about a center, folding jaws swinging about a center, said blade and jaws swinging on the same side of their respective centers during the folding in of the sheet, and means for stopping the swinging movement of said jaws prior to and during the release of the sheet by the jaws.

22. A folding machine including in combination a folding blade swinging about a center, a carrier swinging about a center, a pair of folding jaws mounted upon said carrier to swing about a center, said blade and jaws swinging on the same side of their respective centers during the folding in of the sheet, and means for controlling the swinging movement of said folding jaws.

23. A folding machine including in combination a spring pressed pivotally mounted folding blade, a traveling carrier, and a pair of folding jaws mounted on said carrier to rotate together in the same direction relatively thereto, and coacting with said folding blade to fold the sheet and to move the folding blade about its pivot during said folding of the sheet.

24. A folding machine including in combination a rotating carrier, a folding blade pivotally mounted on said carrier, spring pressure means acting on said blade, a second rotating carrier and a pair of folding jaws mounted on said second carrier for rotation together in the same direction relatively thereto.

25. A folding machine including in combination a traveling folding blade, a traveling carrier, a pair of folding jaws traveling upon said carrier, one of said jaws moving to fold the sheet over the blade and to grip the sheet between the jaws, and a support for said blade whereby it may be moved by the moving jaw during the folding and gripping of the sheet by the jaws.

26. A folding machine including in combination a traveling folding blade, a traveling carrier, a pair of folding jaws traveling upon said carrier, one of said jaws moving to fold the sheet over the blade and to grip the sheet between the jaws, a support for said blade whereby it may move with the moving jaw during the folding and gripping of the sheet by the jaw, and whereby it may then move with the traveling jaws until the blade and jaws separate.

27. A folding machine including in combination a traveling folding blade, a traveling carrier, a pair of folding jaws traveling on said carrier in the opposite direction, one of said jaws moving to fold the sheet over the blade and to grip the sheet between the jaws, a support for said blade whereby it may move with the moving jaw during the folding and gripping of the sheet by the jaw, and whereby it may then move in the opposite direction with the traveling jaws until the blade and jaws separate.

28. A folding machine including in combination a traveling carrier, a pair of folding jaws mounted on said carrier to carry the sheet freely except at its folded edge, a delivery cylinder traveling at a slower speed than the jaws, and means for transferring the sheet from the jaws to the delivery cylinder.

29. A folding machine including in combination a rotating carrier provided with folding jaws, a delivery cylinder, said carrier and cylinder traveling at the same angular speed but the cylinder being of less radius than the carrier.

30. A folding machine including in combination a cylinder having a folding blade and collecting grippers, a plurality of pairs of folding jaws coöperating successively with said folding blade, and a tucking device for tucking the sheet into said grippers, and means for rendering said tucking device operative or inoperative.

31. A sheet-handling machine including in combination a cylinder having sheet taking means, means for feeding the end of a web or sheet contiguously to said cylinder, tucking means which may be moved to tuck the end into said sheet taking means or to permit it to pass and means for controlling said movement of said tucking means.

32. A sheet handling machine including in combination a cylinder having sheet taking means, means for feeding the end of a sheet or web contiguously to said cylinder, tucking means movable into operative and inoperative position relatively to said cylinder and the sheet end, means for holding said tucking means in one of said positions, and means for causing the tucking means to move into the other of said positions.

In testimony whereof, I have signed my name to this specification, in the presence of two subscribing witnesses.

RALPH C. SEYMOUR.

Witnesses:
JOHN D. MORGAN,
KATHARINE SEXTON.